Figure 3:
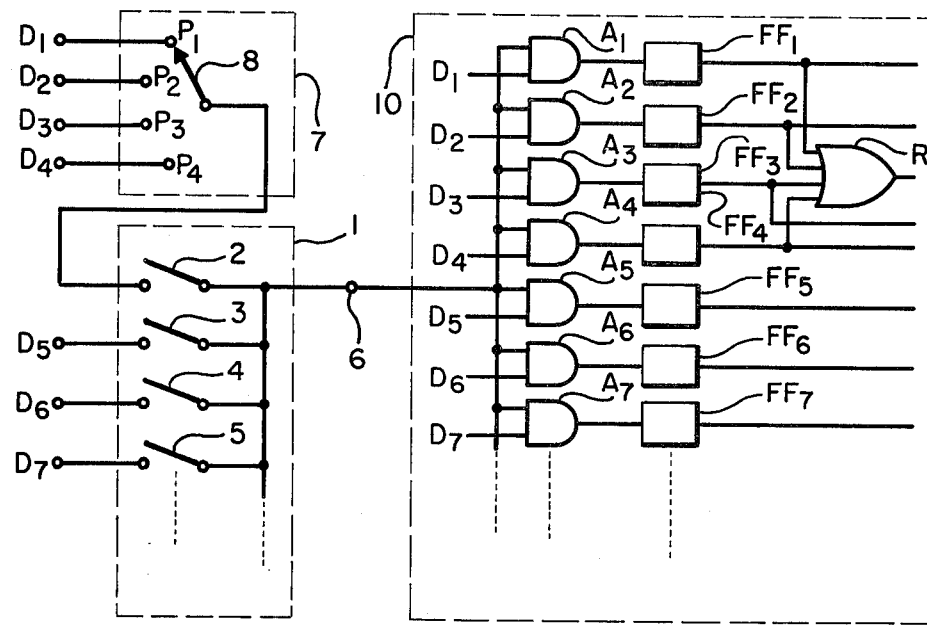

United States Patent [19]
Muranaka

[11] 4,064,399
[45] Dec. 20, 1977

[54] ELECTRONIC CALCULATOR HAVING KEYBOARD FOR ENTERING DATA

[75] Inventor: Susumu Muranaka, Tokyo, Japan

[73] Assignee: Nippon Electric Company, Ltd., Tokyo, Japan

[21] Appl. No.: 672,277

[22] Filed: Mar. 31, 1976

[30] Foreign Application Priority Data

Apr. 3, 1975    Japan .................................. 50-45617

[51] Int. Cl.² ............................................. G06F 15/02
[52] U.S. Cl. ................................ 364/709; 340/365 R; 364/712
[58] Field of Search ............................... 235/152, 156; 340/365 R, 365 S

[56] References Cited

U.S. PATENT DOCUMENTS

| 3,597,600 | 8/1971 | Herendeen et al. | 235/156 |
| 3,715,746 | 2/1973 | Hatano | 340/365 S |
| 3,762,637 | 10/1973 | Hernandez | 235/156 |
| 3,834,616 | 9/1974 | Washizuka et al. | 340/365 S X |
| 3,892,958 | 7/1975 | Tung | 235/156 |

*Primary Examiner*—Jerry Smith

[57] ABSTRACT

An electronic calculator comprises a semiconductor integrated circuit and an input keyboard which includes the series connection of a condition switch and an operation key, thereby minimizing the number of interconnections between the semiconductor integrated circuit and the keyboard.

11 Claims, 5 Drawing Figures

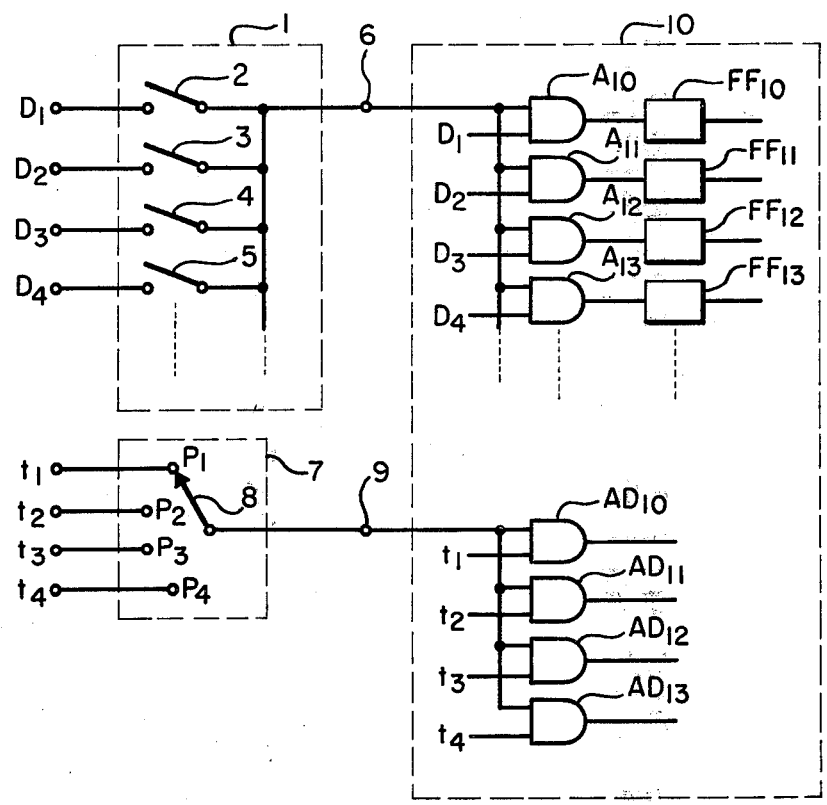
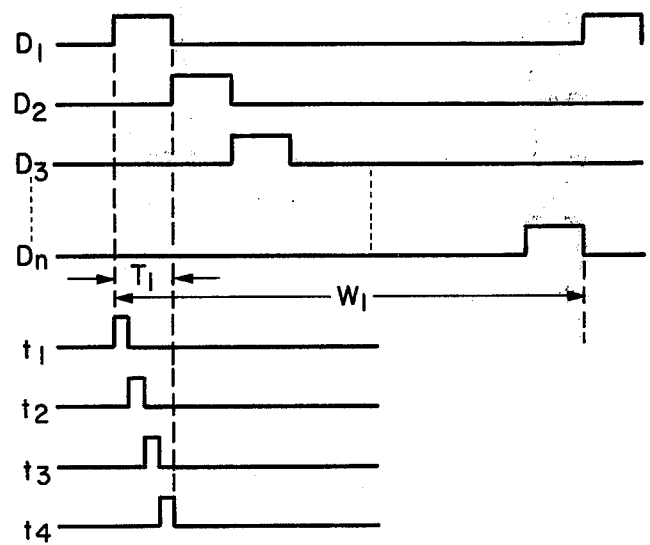
FIG. 1 PRIOR ART
FIG. 2

ELECTRONIC CALCULATOR HAVING KEYBOARD FOR ENTERING DATA

DISCLOSURE OF INVENTION

This invention relates to electronic calculators, and more particularly to the construction of a keyboard for entering input operation data into an electronic desk top calculator.

Electronic desk top calculators in general consist essentially of an integrated circuit (IC) unit, a display unit, and an input unit. The IC unit comprises an arithmetic operational circuit, a control circuit, and so fourth; the display unit includes display means for representing input data and the results of a calculation; and the input unit comprises a keyboard for entering input data into the IC unit. The keyboard comprises condition switches and function keys. The condition switches generate command signals for commanding the arithmatic operation circuit or the control circuit as to the method of arithmetic operational or the method for processing the calculation results. In other words, the condition switches generate signals for conditioning the calculator to be in specific states. The condition switches include a point switch, an accumulation switch, a rounding switch, a constant switch, and the like. The point switch is used to determine the decimal place in the display of calculation results; the accumulation switch is used to cause calculation results to be automatically stored in the memory for accumulation; the rounding switch is used to round calculation results; and the constant switch is used to cause constant calculations to be performed. The function keys include, for example, a plus key for indicating the arithmetic operation of addition, a minus key for indicating the arithmetic operation of subtraction, a division key for indicating the arithmetic operation of division, and an operation key for commanding a calculator to perform arithmetic operations indicated by these function keys.

Prior art techniques have had to equip the semiconductor IC device with input terminals corresponding to the condition switches used, through which the mentioned command signals are introduced into the IC device. This approach, however, involves the problem that a considerable number of terminals must be installed on the semiconductor IC device.

It is therefore an object of the invention to provide a keyboard permitting the number of terminals on the semiconductor IC to be minimized.

It is another object of the invention to provide an electronic desk top calculator which can be manufactured at low cost.

The invention provides a keyboard featured in that the condition switches for instructing the arithmetic operation circuit and the control circuit as to the method of arithmetic operation and the method for processing the calculation results are connected in series with the operation key for commanding a calculator to perform arithmetic operations, whereby the number of terminals on the semiconductor IC is minimized. This serves to minimize the number of interconnections between the semiconductor IC and the keyboard, simplifying the production process, reducing possibilities of failure ascribed to interconnections therebetween, and enhancing the reliability of the device. Accordingly, the invention makes it possible to reduce the cost of the semiconductor IC and, eventually, to lower the cost of the electronic desk top calculator. Another advantage the invention offers is that the extra terminal saved by virtue of the foregoing arrangement of the invention can be utilized as an input or an output terminal for a signal used for another function.

Figure 4A:
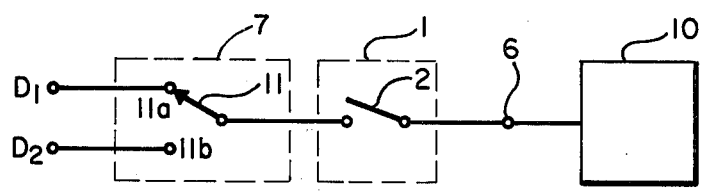
Figure 4B:
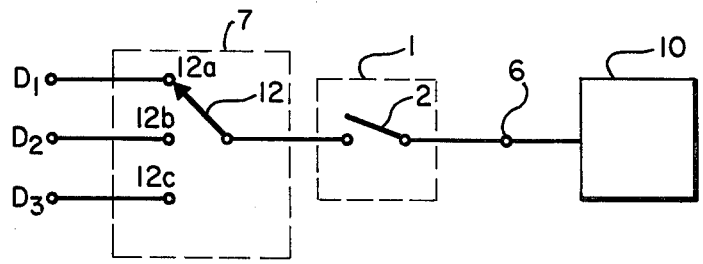

The other objects, features and advantages of the invention will become more apparent from the following description when read in conjunction with the accompanying drawings, in which:

FIG. 1 is a schematic diagram showing in part a prior art keyboard and an integrated circuit which receives input data from the keyboard, FIG. 2 is a diagram showing the timing of digit signals and bit signals used for the keyboard and the integrated circuit, FIG. 3 is a schematic diagram showing one embodiment of the invention, and FIGS. 4A and 4B are diagrams showing other embodiments of the invention.

With reference to FIG. 1, there is schematically shown a prior art arrangement in which a group of function keys 1 include an operation key ⊟ 2, an addition key ⊞ 3, a subtraction key ⊟ 4, and a division key ⊡ 5. One ends of these keys are connected in common to an external input terminal 6 of a semiconductor IC 10. The terminal 6 is connected to one input terminal of plural 2-input AND gates $A_{10}, A_{11}, \ldots, A_{1n}$. The outputs of theses AND gates are supplied to flip-flops $FF_{10}, FF_{11}, \ldots, FF_{1n}$, respectively. Digit signals $D_1, D_2, \ldots, D_n$ shown in FIG. 2 are suppled to the other input terminals of the AND gates $A_{10}, A_{11}, \ldots, A_{1n}$, respectively. These digit signals are used to drive the arithmetic operational circuit, the control circuit, etc. (not shown) on the semiconductor IC, as well as the display elements (not shown). In FIG. 2, $W_1$ denotes the time required for one word-length operation or display, and $T_1$ the time assigned to each of the digits which constitute one word length. The digit signals $D_1$ to $D_4$ are applied to the other ends of the key switches 2 to 5, respectively.

When, for example, the addition key 3 is pushed, the digit signal $D_2$ from the key 3 goes to all the gates $A_{10}, \ldots, A_{1n}$, among which only the gate $A_{11}$ generates an output, causing the flip-flop $FF_{11}$ to be set. The output of the flip-flop $FF_{11}$, indicating that the addition key 3 has been pushed, is coupled to the operation circuit or the control circuit, whereby an addition operation is initiated.

In FIG. 1, the reference 7 denotes a condition switch which sets the calculator into a specific state. The condition switch 7 comprises, for example, a point switch 8 through which the desired decimal place is designated. The switch 8 has fixed contacts $P_1, P_2, P_3$ and $P_4$ selectable by its moving contact. The moving contact of the point switch 8 is connected to an external terminal 9 of the semiconductor IC 10. The terminal 9 is connected to one input terminals of plural 2-input AND gates $AD_{10}, AD_{11}, AD_{12}$ and $AD_{13}$. Bit signals $t_1$ to $t_4$, which are generated for one digit signal period $T_1$ as shown in FIG. 2, are applied to the other input terminals of the AND gates $AD_{10}$ to $AD_{13}$ respectively. These bit signals $t_1$ to $t_4$ are also applied to the fixed contacts $P_1$ to $P_4$ of the switch 8, respectively. When, for example, the contact $P_3$ is selected on the switch 8, the bit signal $t_3$ is applied to all the AND gates $AD_{10}$ and $AD_{13}$ but an output is present only at the gate $AD_{12}$ which has been supplied with the bit signal $t_3$ through its other input terminal. This output goes to the control circuit (not shown), causing the decimal point to be set to the third digit place in a display of a calculation result.

In the prior art keyboard, as has been described above, a considerable number of external terminals must be provided, including the terminal 6 for supplying the semiconductor IC 10 with an input operational signal for indicating addition or subtraction, the terminal 9 for supplying signals necessary to set the calculator into a specific state, and the output terminals for supplying the bit signals and the digit signals to the condition switch 7 and to the function keys 1, respectively. The number of these external terminals must be been reduced to lower the cost of the semiconductor IC 10.

FIG. 3 schematically illustrates an improved keyboard of the invention. Like constituent components are indicated by the identical references in FIGS. 1 and 3. As shown in FIG. 3, the operation key 2 is connected in series to the point switch 8, and hence the moving contact of the point switch 8 is connected to the external terminal 6 of the semiconductor IC 10 through the operation key 2. Digit signals $D_1$, $D_2$, $D_3$ and $D_4$ are applied to fixed contacts $P_1$, $P_2$, $P_3$ and $P_4$, respectively, of the point switch 8. Digit signals $D_5$, $D_6$ and $D_7$ are applied to keys 3, 4 and 5 which are assigned, for example, to addition, subtraction and division operations, respectively.

On the semiconductor IC, the external terminal 6 is connected to one input of plural 2-input AND gates $A_1$, $A_2$, ..., $A_n$, and digit signals $D_1$, ..., $D_n$ are supplied to the other input terminals thereof, respectively. The outputs of the AND gates $A_1$, ..., $A_n$ are supplied to flip-flops $FF_1$, ..., $FF_n$, respectively. Four outputs of flip-flops $FF_1$ $FF_4$ are applied to a different input of a four-input OR gate R. Assuming that the contact $P_3$ of the point switch 8 is selected when the operation key 2 is pushed, the digit signal $D_3$ is applied to all the AND gates $A_1$ and $A_n$ through the operation key 2. Therefore, only the AND gate $A_3$, which is supplied with the digit signal $D_3$ as its second input, generates an output signal. This output signal sets the flip-flop $FF_3$. The set signal output of the flip-flop $FF_3$ is supplied to the arithmetic operation circuit and the control circuit (not shown) through the OR gate R, whereby the required arithmetic operation is performed. The set signal of the flip-flop $FF_3$ is also directly furnished to the operation circuit and the control circuit, causing the decimal point to be set to the third digit place in a display of a calculation result.

Thus, since the output signal emanates from the OR gate R when the operation key 2 is pushed, the required arithmetic operation can be performed by utilizing the output signal of the OR gate R. At the same time, one of the set signals of flip-flops $FF_1$ to $FF_4$ is directly supplied to the succeeding circuit, causing the decimal point to be set to the digit place selected by the point switch 8.

Thus, according to the invention, an external terminal used for a point switch can be obviated on the semiconductor IC, and hence the IC can be manufactured at low costs.

Another embodiment of the invention is schematically illustrated in FIG. 4. Referring to FIG. 4A, an accumulation switch 11 is connected in series with an operation key 2. The switch 11 has selectable fixed contacts 11a and 11b, to which digit signals $D_1$ and $D_2$ are applied, respectively. On the switch 11, the contact 11a is normally selected. In this state, when the operation key 2 is pushed, a normal arithmetic operation signal ($D_1$) is supplied to a semiconductor IC 10. However, when the operation key 2 is pushed with the contact 11b selected, an signal $D_2$ for indicating a accumulation operation is supplied to the semiconductor IC 10.

Thus, in this embodiment, whether a normal arithmetic operation or an accumulation operation is designated is determined according to which of the signals $D_1$ and $D_2$ emerges from the terminal 6, without the need for providing the semiconductor IC with an external input terminal for the accumulation switch.

FIG. 4B shows an arrangement in which the condition switch 7 comprises a rounding switch 12 capable of initiating 5/4 rounding, up-rounding and down-rounding. The rounding switch 12 is connected in series with the operation key 2. Digit signals $D_1$, $D_2$ and $D_3$ which correspond to 5/4 rounding, up-rounding and down-rounding are applied to fixed contacts 12a, 12b and 12c of the switch 12 respectively. When the contact 12a is selected on the switch 12, the signal $D_1$ is supplied to the semiconductor IC 10 via the key 2. Accordingly, the required arithmetic operation is performed and a calculation result is indicated in 5/4 rounding. When the contact 12b or 12c is selected on the switch 12, the signal $D_2$ or $D_3$ is supplied to the semiconductor IC, thereby causing up-rounding or down-rounding command to be generated.

The condition switches may also include a constant switch (K switch) for constant calculation. By serially connecting the constant key with the operation key, it becomes possible to reduce the number of external terminals on the semiconductor IC.

What is claimed is:

1. An electronic calculator comprising: a semiconductor integrated circuit having an arithmetic operation circuit, a control circuit and a terminal for receiving command signals for said operation and control circuits; a condition switch for generating a first command signal for said semiconductor integrated circuit, said switch being fixed to continue generating said first command signal once said switch is set to generate said first command signals; and an operation key for generating a second command signal for the calculator to perform a required arithmetic operation; wherein said operation key is connected between said condition switch and said terminal of said semiconductor integrated circuit, and said first and second command signals generated by said condition switch and said operation key are applied to said terminal of said semiconductor integrated circuit.

2. An electronic calculator of claim 1, wherein said condition switch is a point switch used to determine the decimal place in the display of the calculation results.

3. An electronic calculator of claim 1, wherein said condition switch is an accumulation switch used to accumulate calculation results.

4. An electronic calculator of claim 1, wherein said condition switch is a rounding switch used to round calculation results.

5. An electronic calculator of claim 1, wherein said condition switch is a constant switch for conditioning the calculator to perform constant calculations.

6. The electronic calculator of claim 1, wherein said condition switch has several fixed contacts and one moving contact, said moving contact always being connected to one of said fixed contacts.

7. In combination in an electronic calculator, condition switch means having plural inputs, a common ouput, and means for connecting one of said inputs with said output, a calculator integrated circuit having an input terminal, and an operation key connected between said common output of said condition switch means and said input terminal of said calculator integrated circuit.

8. A combination as in claim 7 wherein said integrated circuit further comprises plural multiple input coincidence logic gates each having a first input connected to said integrated circuit input terminal, and means for supplying time separated pulses to said plural inputs of said condition switch means and to second input terminals of said coincidence logic gates.

9. A combination as in claim 8 further comprising disjunctive logic gate means connected to said coincidence logic gates for producing an operation signal.

10. A combination as in claim 9 further comprising plural storage means each connected between an input of said disjunctive logic means and a different one of said coincidence logic gates.

11. A combination as in claim 7 further comprising plural function keys having output terminals connected to said input terminal of said calculator integrated circuit.

* * * * *